Aug. 8, 1933.   G. K. LEWIS   1,921,164
COMPOSITE LAMINATED PANEL
Filed Aug. 16, 1930

Witness:
William P. Kilroy

Inventor:
George K. Lewis
By George I. Haight
Atty

Patented Aug. 8, 1933

1,921,164

UNITED STATES PATENT OFFICE 1,921,164

COMPOSITE LAMINATED PANEL

George K. Lewis, Chicago, Ill., assignor to Met-L-Wood Corporation, Chicago, Ill., a Corporation of Illinois Application August 16, 1930. Serial No. 475,741

1 Claim. (Cl. 20—91)

My invention relates to improvements in composite laminated panels of the type composed of a laminated core or body of fibrous material, with sheet metal laminations on both sides of the body, and a fabric bonding material interposed between the metal sheets and the body, all of said laminations being glued together and compressed into a unitary structure.

The object of my invention is to provide a composite laminated panel of the above character which can be formed or bent as a unit to conform to corners, curves and shapes without the necessity of cutting away portions of the layers or laminations.

Other objects of my invention will appear hereinafter.

Referring to the accompanying drawing which illustrates my invention—

Composite laminated panel structures of the type to which my invention relates are manufactured as flat board or units of a convenient length and width best suited for production purposes. These panels comprise a body portion made up of a plurality of laminations of wood or fibers glued together in compact relation, and on one or both sides of the body is a layer or veneer of sheet metal, generally sheet steel. Between the body and the exterior sheet metal layers is interposed a fabric bonding material, such as canton flannel, secured to the layers by glue or other suitable adhesive. The entire structure is compressed into a flat compact form and forms a panel or board of great strength, although relatively thin and light in weight.

It has been the practice to build up the body portion of a plurality of layers or laminations of wood or fibrous material of suitable thickness, and in assembling these layers to place them with the grain or fiber in different directions relatively to each layer for the purposes of rendering the panel rigid and strong and incapable of warping or distortion.

It is very desirable in fabricating structures with these panels to bend or form the panels to conform to curves or other shapes such as corners in which the panel has a portion thereof in one plane and another portion in another plane at an angle thereto, the desirable factor being that the corner or curved portions shall be integral or continuous with the other flat portions of the panel. In order to prepare the panels it has been the practice to cut away portions of the thickness or groove the panel along the line of the bend to be made and join the severed metal laminations after the bend has been made.

Figure 1:
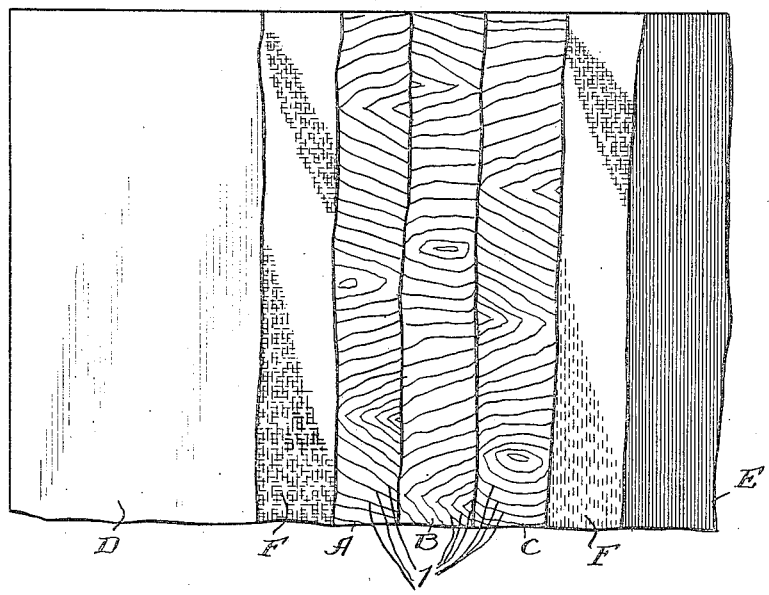
Figure 1 is a face or plan view of a portion of a composite panel, the several laminations being partially broken away to show the arrangement thereof.

I have discovered that, without materially affecting the strength of the panel, the structure can be rendered readily bendable as a unit by arranging the grain or fibers of all of the laminations of the body or core in the same direction. In building up the body or core, the several laminations A, B and C, Fig. 1, of wood are assembled in superposed relation with the grain or fibers all laid in the same direction. These layers or laminations are glued together and the exterior sheet metal sheathings D and E are placed on each side of the body with a fabric bond F between them and the body, these being also assembled with glue, and the whole structure compressed by the same process of manufacture as heretofore used. However, in assembling the laminations A, B and C which make the body, the direction in which the grain or fibre runs in all of these laminations is arranged to correspond.

Figure 2:
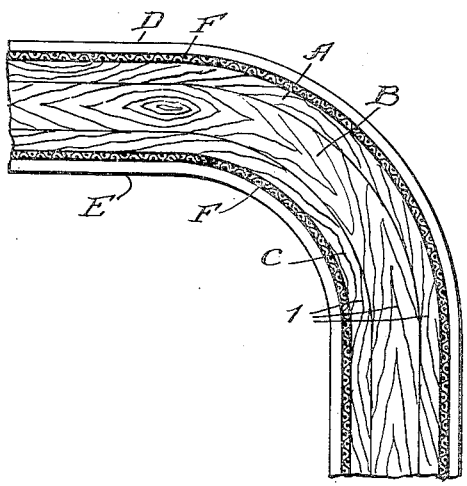
Figure 2 is an edge view of said panel structure formed on a curve to show the manner in which the panel can be bent as a unit.
Figure 3:
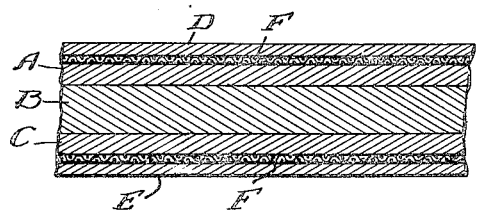
Figure 3 is a cross-sectional view of said panel structure.

Since the grain or fiber of all of the body laminations is disposed in the same direction in the panel, it permits of a certain flexibility in the panel at substantially right angles to the direction of the grain or fibers and by reason of this flexibility the panel can be bent as a unit without causing buckling in the bends or separation of the laminations. Panels made up in this manner are particularly adaptable to being bent on more gradual or larger curves, such as indicated in Figure 2 which shows a panel on a relatively large arc such as used in vehicle bodies or other fabricated structures which require bends of this character to an angle of about 90°. However, such panels are not adapted to be bent on such sharp angles as to form edge bends.

The forming is done by suitable bending machinery used for this purpose. The advantage of my improved panel is the reduction of cost of forming bends or curves because the panel is inherently bendable and requires no grooving or other preparatory work for this purpose. Furthermore a neat appearing continuous structure both on the inside and outside of the curve is produced.

What I claim is:

A bendable composite panel capable of being bent without distortion or variation in thickness comprising relatively thin sheet metal exterior laminations; a relatively thick intermediate body of fibrous material; and a bonding fabric between each sheet metal lamination and the body, said body being composed of a plurality of laminations of wood disposed with the direction of the grain or fiber thereof arranged to correspond in all of said laminations, said laminations and bonding fabric being glued together in superposed compact relation.

GEORGE K. LEWIS.